US006996603B1

(12) United States Patent
Srinivasan

(10) Patent No.: US 6,996,603 B1
(45) Date of Patent: Feb. 7, 2006

(54) AUTOMATIC DESKTOP AUDIO/VIDEO/DATA CONFERENCING DISTRIBUTOR

(75) Inventor: Thiru Srinivasan, Highlands Ranch, CO (US)

(73) Assignee: Qwest Communications International, Inc., Denver, CO (US)

( * ) Notice: Subject to any disclaimer, the term of this patent is extended or adjusted under 35 U.S.C. 154(b) by 0 days.

(21) Appl. No.: 09/386,787

(22) Filed: Aug. 31, 1999

(51) Int. Cl.
 *G06F 15/16* (2006.01)
(52) U.S. Cl. .................... 709/204; 370/352; 370/401; 709/206; 379/265.02; 379/266.01; 379/266.06
(58) Field of Classification Search ............... 709/204, 709/203, 205, 217, 206, 227; 370/352, 270, 370/401; 379/265.01–265.09, 266, 90.01, 379/93.14, 93.17, 88.04, 93.23, 69, 80, 220.01, 379/242, 265.1–265.14, 266.01–266.09, 379/266.1, 226
See application file for complete search history.

(56) References Cited

U.S. PATENT DOCUMENTS

| 4,510,351 | A | * | 4/1985 | Costello et al. ......... 379/265.01 |
| 5,848,143 | A | * | 12/1998 | Andrews et al. ........ 379/265.09 |
| 6,058,163 | A | * | 5/2000 | Pattison ................. 379/265.06 |
| 6,128,380 | A | * | 10/2000 | Shaffer et al. ......... 379/265.01 |
| 6,157,924 | A | * | 12/2000 | Austin ......................... 707/10 |
| 6,212,178 | B1 | * | 4/2001 | Beck et al. .................. 370/352 |
| 6,259,774 | B1 | * | 7/2001 | Miloslavsky ............. 379/90.01 |
| 6,295,551 | B1 | * | 9/2001 | Roberts et al. ............. 709/205 |
| 6,332,154 | B2 | * | 12/2001 | Beck et al. .................. 709/204 |
| 6,393,018 | B2 | * | 5/2002 | Miloslavsky ................ 370/352 |
| 6,404,747 | B1 | * | 6/2002 | Berry et al. ................. 370/270 |
| 6,404,883 | B1 | * | 6/2002 | Hartmeier .............. 379/265.03 |
| 6,539,419 | B2 | * | 3/2003 | Beck et al. .................. 709/204 |
| 6,549,539 | B1 | * | 4/2003 | Neyman ..................... 370/401 |
| 6,665,395 | B1 | * | 12/2003 | Busey et al. ........... 379/265.09 |
| 6,678,718 | B1 | * | 1/2004 | Khouri et al. .............. 709/204 |
| 6,690,788 | B1 | * | 2/2004 | Bauer et al. ................ 379/242 |
| 6,718,366 | B2 | * | 4/2004 | Beck et al. .................. 709/204 |

\* cited by examiner

*Primary Examiner*—Wellington Chin
*Assistant Examiner*—Chuong Ho
(74) *Attorney, Agent, or Firm*—Robert G. Crouch; Marsh Fischmann & Breyfogle LLP

(57) ABSTRACT

A communications system provides for the establishment of audio/video/data connections between system users employing a personal computer and Web browsers, to agents of a business or organization. A business or organization may provide a Web server through which system users may connect either over a data network or over the Public Switched Telephone Network (PSTN). Once connected, various screen displays may be provided through which system users may enter account or other personal information which the server may employ to locate a profile for the system user. A system user may be provided the option to establish communication with an agent in a number of different modes. Once a mode is selected, the system user will be connected with an agent who is best able to serve the system user based on the profile information found in memory. If an agent isn't available, the system is configured such that connections may be entered in a queue and information with regards to position in queue and waiting time can be provided to the system user. Further, functionality is also provided for the system user to search other websites while maintaining their position in the queue.

14 Claims, 11 Drawing Sheets

| Name | I.P. Address |
|---|---|
| John Smith | 521.362.116 |
| Jane Smith | 466.566.366 |
| Bob Jones | 987.654.321 |
| Mary Martin | 842.636.721 |

[ Enter ]  [ Cancel ]

FIG. 10

AUTOMATIC DESKTOP AUDIO/VIDEO/DATA CONFERENCING DISTRIBUTOR

FIELD OF THE INVENTION

The present invention relates to a system for facilitating communications between parties using personal computers and, more particularly, to a system which provides for establishing lines of communication over a data network or telephone lines, and provides for establishing lines of communication in a number of different modes, such as audio, video, and/or data.

BACKGROUND OF THE INVENTION

Many companies and other organizations possess phone systems which direct callers to agents employed by the business. The voice calls can originate from either the Public Switched Telephone Network (PSTN) or the Internet. When calls are placed, the callers are typically queued up in the Customer Premise Equipment (CPE) as in a Private Branch Xchange (PBX) where they hear music or important announcements about the company the callers dialed. An Automatic Call Distributor (ACD), which is part of the CPE, may be programmed to inform callers of their position and the average wait time when the callers enter the queue. However, many systems will not provide updates to the caller with regards to the status of the position or the wait time in the queue thereafter.

An ACD is a software package that runs on a PBX or central office switch. It is programmable via either the Call Management System (CMS) or the touch of the keypad of a telephone set, i.e. a supervisor can issue commands to alter characteristics of splits in the ACD. Agents may log into their assigned splits based on the skills. They manage their own states by using the touchtone pad of the telephone sets.

The supervisor may also have access to the CMS which is an adjunct of the PBX. This adjunct system allows the supervisor to set up a profile of an agent as belonging to a particular split based on the skills of the agent. For example, the supervisor can set up a default profile for an agent to always log into a Spanish-speaking split. The supervisor, using the CMS, can monitor the performance of the ACD in terms of the call volume to the different splits, average time for the splits to answer an incoming call, etc.

SUMMARY OF THE INVENTION

It has been recognized that data networks, such as the Internet, are being employed more often for things such as reviewing product information at company websites and for e-commerce. It has further been recognized that network tools such as IP telephony, video conferencing, and real time data interchanges, through such devices such as a white board, may be employed to communicate with potential customers or clients through a company website.

The system described herein provides for the establishment of lines of communication between users of personal computers and representatives of a business or organization. In operation, a system user may try to contact a business or organization through either a data network such as the Internet, or a direct connection over the Public Switched Telephone Network (PSTN) through use of a modem. Through either method, a connection may be established with a network server controlled by the business or organization. The server may include a number of interactive displays which may be presented to the web browser employed by the system user. Included in the displays may be options on establishing a lines of communication.

In one aspect of the invention, lines of communication may be established in an audio mode, a visual mode, and/or a data mode. In the scenario where a system user selects the audio mode, a connection may be established between the system user and an agent through use of IP telephony. A system user may also select a video conferencing function in which a video and audio connection may be established between the system user and agent. Finally, if the system user selects a data connection, communications between the system user and the agent may be facilitated through the use of a white board with which the parties may exchange textual messages.

In another aspect of the invention, the server is connected to a data network, like the Internet, and a system user, through use of a dialup connection to an Internet Service Provider (ISP) and a web browser, may establish a connection with the server. Alternatively, the server may be equipped with a modem and a connection to a PSTN. A system user, with a modem and a phone connection, may then dial up the network server directly.

Once a system user has established a connection, the server may provide a number of interactive screen displays with which a system user may interact to further establish a connection with a representative in a desired mode of communication. One screen display which may be provided is a informational input display in which a system user would input a name and possibly an account number in order for the system to locate personal information about the system user stored in memory. Once accessed, this information can be provided to the representative who will connect with the system user.

As with most customer service systems, there may be times when a representative is not available to whom a connection may be established. For this situation, a queue may be provided in which a system user's connection may be routed until a representative becomes available. In conjunction with being routed to the queue, the system user may be presented with another screen display which provides status information as to the system user's connection. This status information may include the number of other system users in the queue, and an estimated length of wait before a connection may be established with an agent. For situations in which the system user chooses not to wait in order to establish a connection, a screen display may be presented in which the system user may enter information regarding identification and times and numbers for receiving a telephone call from an agent.

In another aspect of the invention, while the system user is in the queue, screen displays may be presented which include hypertext links to designated websites. These links may be to informational websites for the organization or business which the system user is contacting, as well as a number of other sites that may be of interest. The system is configured such that selection of one of the hypertext links does not remove the system user's connection from the queue.

Once an agent is identified to receive the connection, another screen display may be presented to the system user which includes different selections for modes of communication. As described above, these selections may include an audio, video and/or data connection. Once a system selects a particular mode, the system will facilitate the connection.

Before or during a connection with the agent, the system user may also be provided with a screen display which includes relevant information about the agent to whom the connection has or will be established. In particular, this information may include name, telephone number, supervisor's name and number, e-mail address, and any relevant experience.

Upon establishing a connection with an agent, information regarding the system user may be automatically retrieved from a memory and presented to the agent. The agents may be connected to the server over a Local Area Network (LAN), and information regarding the system users may be accessed in the server. In the situation where a video connection will be established, pictures of the system users stored in memory may be accessed and presented to the agent in order to confirm the identity of the party.

In yet another aspect of the invention, the server includes the functionality to distribute the incoming connections of the system users to the agents which are connected to the server through the LAN connection. In general, this functionality includes the ability to route system users to an agent based on compatibility placing the system users in a queue when all of the agents are occupied, routing the connection to agents as they become available, and provide particular personal information for the system users who are being connected. Further functionality which may be incorporated in the server includes the functionality for agents to log on to the system, change their operating status and input information with regard to the type of system users with which they will receive connections for. As an example, an interactive screen display may be provided to agents from the server through which they can change their availability status with regards to the system. Some examples of status changes include when an agent is available to receive calls, an agent is currently unavailable, and an agent is placing an outgoing call to a customer.

Because agents may have particular skill levels with regards to dealing with system users, the routing of incoming connections to agents may be controlled by storing a profile (i.e. split) for a particular agent in the server memory. Based on the information in the split and the personal information relating to the system user retrieved from the server memory, the connection may be routed to an appropriate agent.

A supervisor may have access to a screen display through which changes may be made to the splits with regards to particular agents. Further, screen displays may also be provided through which a supervisor may monitor the identity of system users either currently connected or in the queue.

BRIEF DESCRIPTION OF THE DRAWINGS

FIG. 10 discloses a screen display which displays information with regards to system users waiting in the queue.

DETAILED DESCRIPTION

Figure 1:
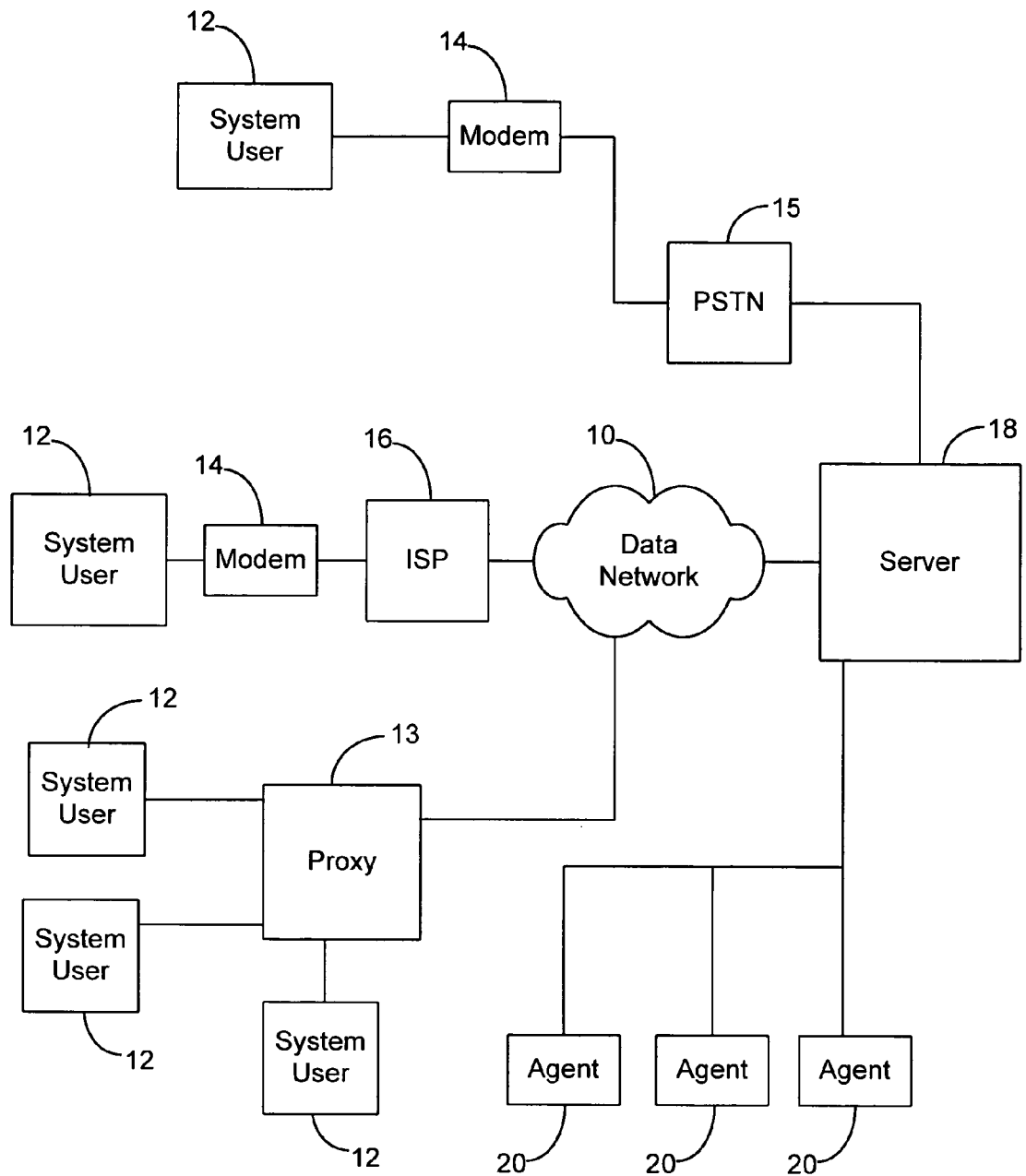
FIG. 1 discloses a diagram for the communications system, including the data network.

Disclosed in FIG. 1 is a diagram for the communications system described herein. The network communications server 18 may be of any number of network servers commercially known. Connections may be established to the network through data network 10, which may be the Internet. The server 18 may also include a dialup connection where connections may be established directly to the server through a Public Switched Telephone Network (PSTN) 15. Finally, direct connections may be established to a number of local computers through a Local Area Network (LAN) type configuration.

The system users, who employ personal computers and like devices, may establish a connection with communications server 18 through at least three different modes. According to one mode of communication, a system user 12 with a personal computer and Web browser software may employ a modem 14 to establish a telephonic connection with Internet Service Provider (ISP) 16. Through the ISP, a connection may be established with data network 10. As is seen in FIG. 1, server 18 is connected as a node on the data network 10.

Another line of communication may be established to the system of FIG. 1, through the PSTN. The user 12, through use of the modem 14, may establish a direct telephonic connection through PSTN 15 to the communications server 18. The communications server includes a modem adaptable for receiving telephonic communications.

Yet another line of communication may be established through a LAN server with an Internet proxy 13. System users 12 employ personal computers with direct connections to server in order to contact the server 18.

The present system may be employed to establish lines of communication between system users and agents of a business or organization through the use of personal computers. As is well known in the art, many telephone systems now exist today where parties interested in contacting a organization or business may dial up a designated number and a system employed by the organization or business routes the incoming telephone calls to available agents. The present system provides the functionality for the system users who are using a personal computer to establish a connection either over a data network or over the PSTN with an agent.

Once a system user establishes a connection with the communications server, interactive screen displays may be presented to the system user through use of web browser software, and the system user may enter personal information such that further account information may be retrieved from a memory in the server. The communications server may then route the connection along with the personal information to an available agent who has the profile to handle the system user. The system user may be provided choices for selecting a desired mode of communication.

If when a system user establishes a connection and there are no agents available, the connections may be placed in a queue. While in the queue, the system user may be provided with information as to wait time and position in the queue. Once an agent does become available, the connection may then be routed to the identified agent along with the personal information for the system user. The system further provides for allowing system administrators and agents to make status changes with regards to the operations of the system.

Figure 2:
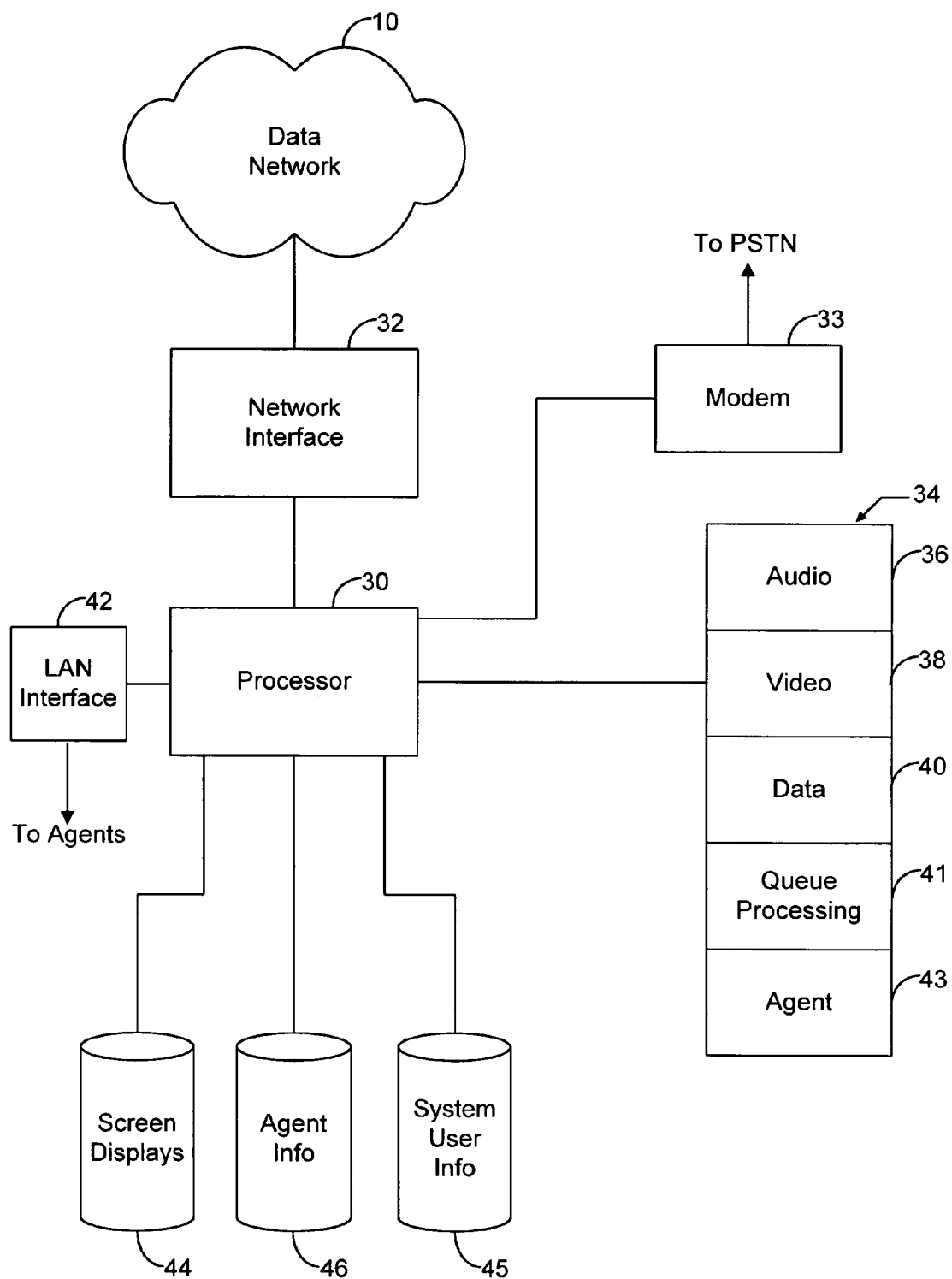
FIG. 2 discloses an internal system diagram for the communications server.

Disclosed in FIG. 2 is an internal system diagram for the communications server 18. In order to establish user connections over the data network 10 a network interface 32 is provided. This interface provides for the two-way transmission of data signals such as those types of signals which would be received and transmitted over the Internet. Also incorporated into the server is modem 33. As was discussed above, this modem provides for a direct connection between a system user and the communications server over the PSTN. The central processor 30 controls the operation of the server and directs the internal signals between the various interfaces and the various memories and processing modules.

In order to provide the various modes of communication, the communications server includes a number of processing modules 34. Some of the processing modules included provide for either audio, video, or data conferencing with system users. The audio 36, video 38 and data conferencing module 40 incorporates the software known in the art in order to establish these types of connections.

Queue processing module 41 provides for the routing of system user connection to a queue and provides the functions which may be performed in the queue by the system user. The use of the queue will be described in greater detail below. Agent processing module 43 provides for all functions performed by agents in order to make status changes and for supervisors to monitor and manipulate information with regards to the agents. These functions will be also described in greater detail below.

Also in connection with processor 30 are a number of different databases which include information employed by the system. Stored in screen display database 44 are the interactive screen displays which are presented to the system users establishing the connection with the server, as well as the agents with whom the system users are communicating. Included in database 46 is specific information as to the profile, or split of a particular agent. A split includes information relating the types of system users which the particular agent may communicate with. For example, if an agent is proficient in speaking Spanish, when a system user establishes the connection with the communications server, personal information for the system user may note that system user speaks Spanish, and thus the particular agent may provide services for the system user. Included in database 30 is personal, or account, information about the system users who establish a connection with the system. This information, as well as the information in database 46 may be used to populate the screen displays retrieved from database 44.

Customer database 45 contains information relating to the system users who establish a connection with the system. The information contained in this database may include tables which relate account numbers to other profile information with regards to the system user. This information may be things such as purchases made in the past, amounts of money spent, language which the system user wishes to communicate in, as well as any other relevant information which may be of help to an agent.

Another element of the communications server is the LAN interface 42. This interface provides for the connections established between the various personal computers employed by the agents and the communications server.

In operation, a system user may establish a connection with the communications server either through the data network 10 or over the PSTN 15. The web browser incorporated into the system user's computer provides for the system user to establish a connection with the business or organization's web page located on the communications server 18. Through access of this web page, a number of additional functions may be performed.

Figure 3:
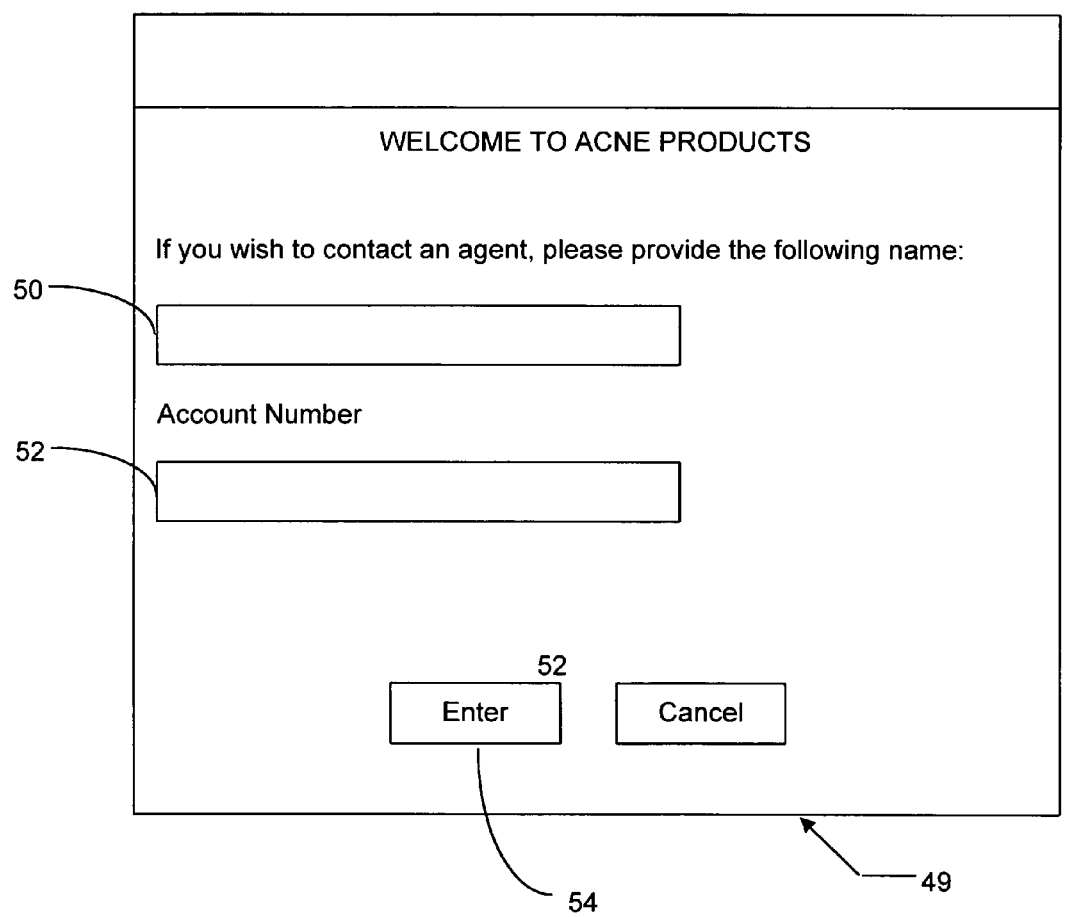
FIG. 3 discloses an interactive screen display presented to system users upon establishing communications server.

Disclosed in FIG. 3 is a web page which a system user may be presented when a connection is initially established with the communications server. Included in this web page are a number of interactive features which allow a system user to enter information about themselves such as name and account numbers. For example, in FIG. 3 the web page 49 includes dialogue boxes 50 and 52 which request that a system user enter their name and account number, respectively. Upon entry of this information in the appropriate dialogue box, the enter button may be selected and the information entered.

Figure 4:
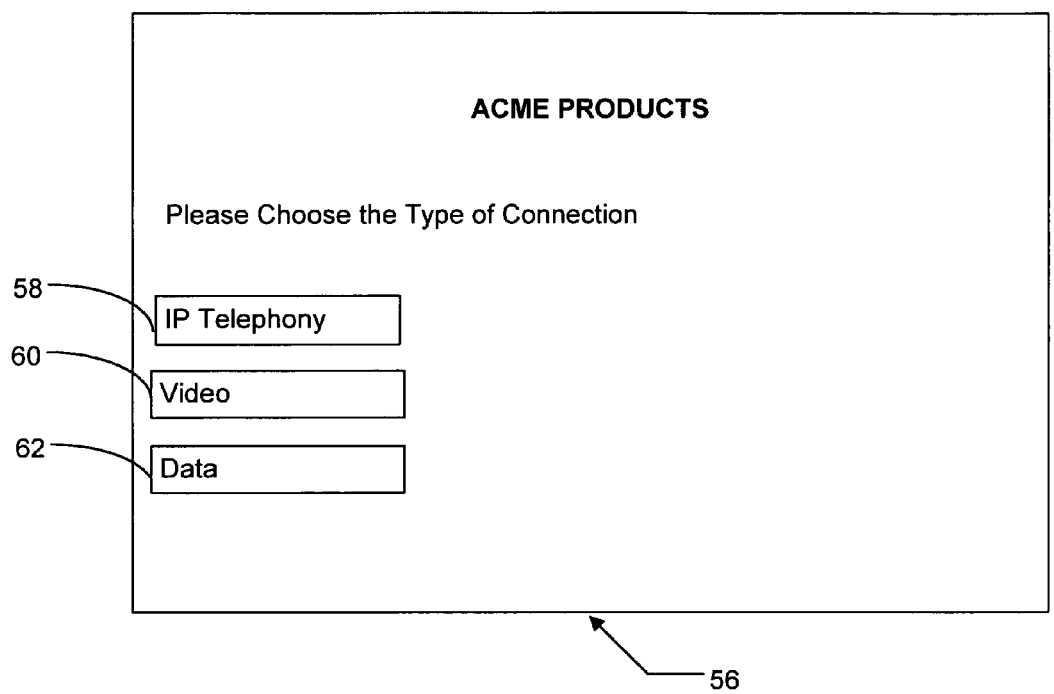
FIG. 4 discloses an interactive screen display presented to system users to select a mode of communications.

After the information is entered, a screen display such as that disclosed in FIG. 4 may be presented to the system user. Through this interactive display graphic 56, the system user may select the mode of communication to be used when communicating with an agent of the organization or business. As seen in the example display graphic, three modes of communication are available for selection. If button 58 is selected, an audio connection is established employing IP telephony. As is currently known in network technology, many software packages are available which when installed on the server and used in conjunction with plugins incorporated into web browsers, provide for audio communication between parties. If the video button 60 is selected, a video and audio connection may be established between the parties. As with the audio selection, video conferencing software and hardware packages are available for making such a connection. These packages include Microsoft meeting or Netscape Conference.

Another communication mode provided on the interactive display graphic 56 is data conferencing. Upon selection of button 62, the server will establish a data conference between the system user and the designated agent. For this situation, the parties activate software which presents a white board upon which textual messages may be exchanged. Commercial software packages (NetMeeting for example) are also available to perform these functions.

Figure 5:
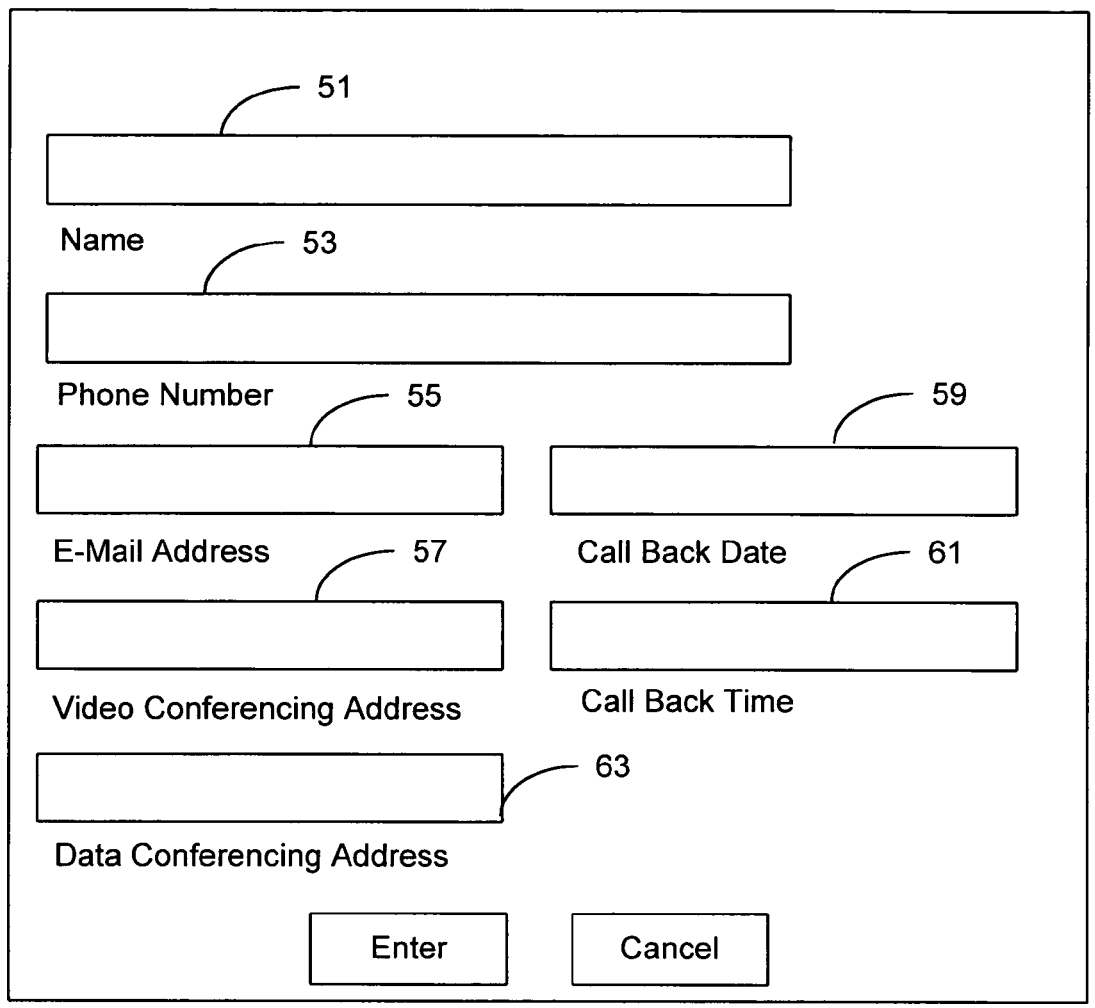
FIG. 5 discloses a call status window screen display which is presented to system users once a connection has been placed in the queue.

Once a connection has been established to the server and a system user chooses a particular mode of communication, the system connects the system user to an agent, if one is available. However, the situation may exist where no agent is available to receive the communication. In this case, the system user may be provided the option of entering information in a screen display such that the business or organization operating the communications server may contact the system user directly. Disclosed in FIG. 5 is a screen display which may be employed for this purpose. Various dialog boxes are included in the screen display for entering personal information. This information may include date and time for a call back 59 and 61, respectively, name 51, home or work telephone number 52, e-mail 55, video conferencing 57, or data conferencing 63 addresses. Once the system user is finished entering the information it is then stored in the system memory.

Once the call back information is entered in memory it may be periodically searched by the system in order to perform call back functions. The call back functions include searching the stored information for dates the call back should occur, and when relevant dates are located, notifying an available agent who may then initiate the call back.

Figure 6:
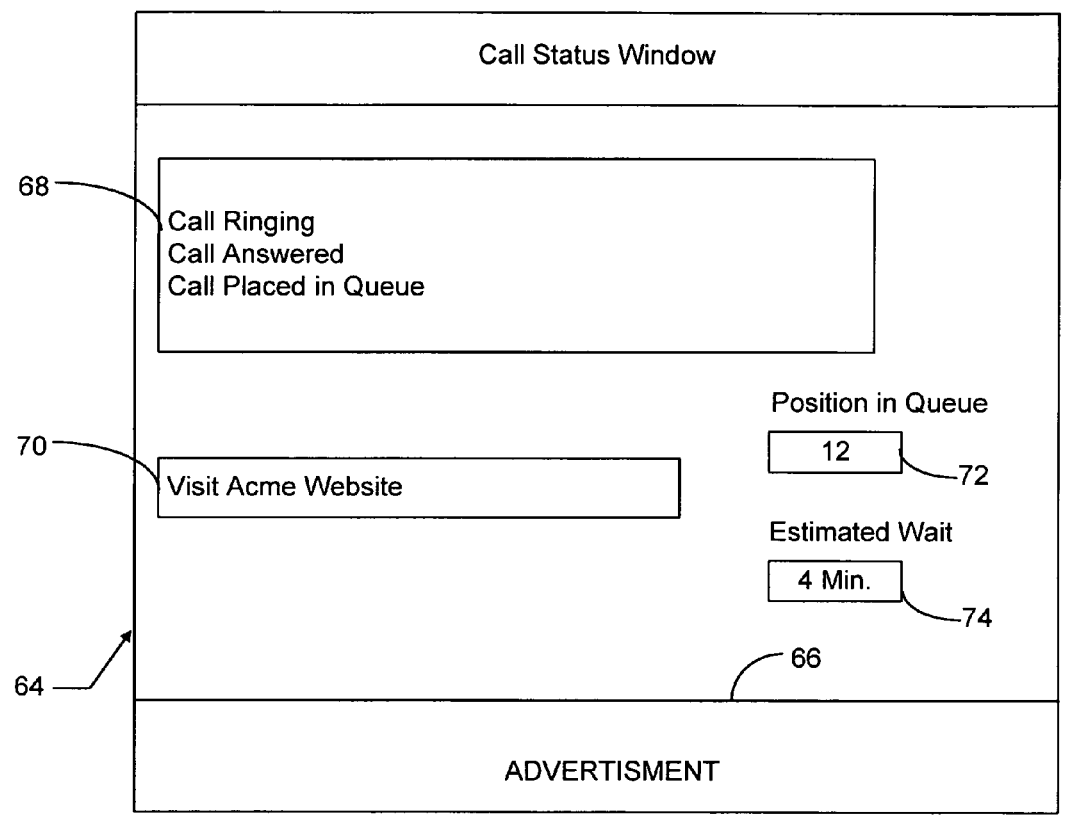
FIG. 6 discloses an interactive screen display presented to agents to make status changes.

If the system user chooses to wait for an available agent, the system may then place the connection in a queue where it is held until an appropriate agent becomes available. If the system user chooses to move the connection to the queue, display graphic 64 disclosed in FIG. 6 is presented to the system user. This display graphic provides a variety of different kinds of information which may be useful to the system user. Dialogue box 68 provides status information to the connections being placed in the queue. As seen in the example, when an audio call is placed, different steps for the status of the connection are displayed. Included may be a call ringing statement, a call answer statement and a call placed in the queue because no agents are available.

Once a connection is placed in the queue, the system will provide additional information and dialogue boxes 72 and 74 as to a system users position in the queue and the estimated wait before a connection to an agent may be established. The position may be determined by the number of system users previously connected. The estimated wait may be determined through an algorithm which provides an average call length for the call currently in connection. As an additional feature, the interactive display graphic 64 may include a hypertext link 70 provided by the business or organization controlling the server, which when selected, connects the system user to the organization's or company's home page such that the system user may view information as to products and services. Using the web browser, the system user may move through the various pages provided by the system user without moving out of the queue. Finally, the interactive display graphic 64 may include a banner advertisement transmitted from the communications server using Push technology. While the system user is waiting in the queue, the advertisement may be changed on a periodic basis.

When an agent becomes available, the connection may then be routed to this party. The routing of a call from the queue to an available agent will be done using the domain address of an agent. The domain address of the agents and the supervisors will not be known to the customer unless the agent discloses them voluntarily. Prior to the connection the selected agent may be provided with the identification information about the system user. The system user, in turn, may be provided with a screen display which includes various types of information about the selected agent. This information may include the agent's name, telephone number, supervisor's name and number, e-mail address, and any relevant experience. A connection may then be established between the system user and the agent according to the mode selected by the system user. As was mentioned above, both the system user's computer and the agent's computer include the necessary processing submodules in order to facilitate the chosen mode of communication. Upon completion of the connection, regardless of the mode, the parties may simply press the disconnect button included on the screen display and the connection will be terminated.

Figure 7:
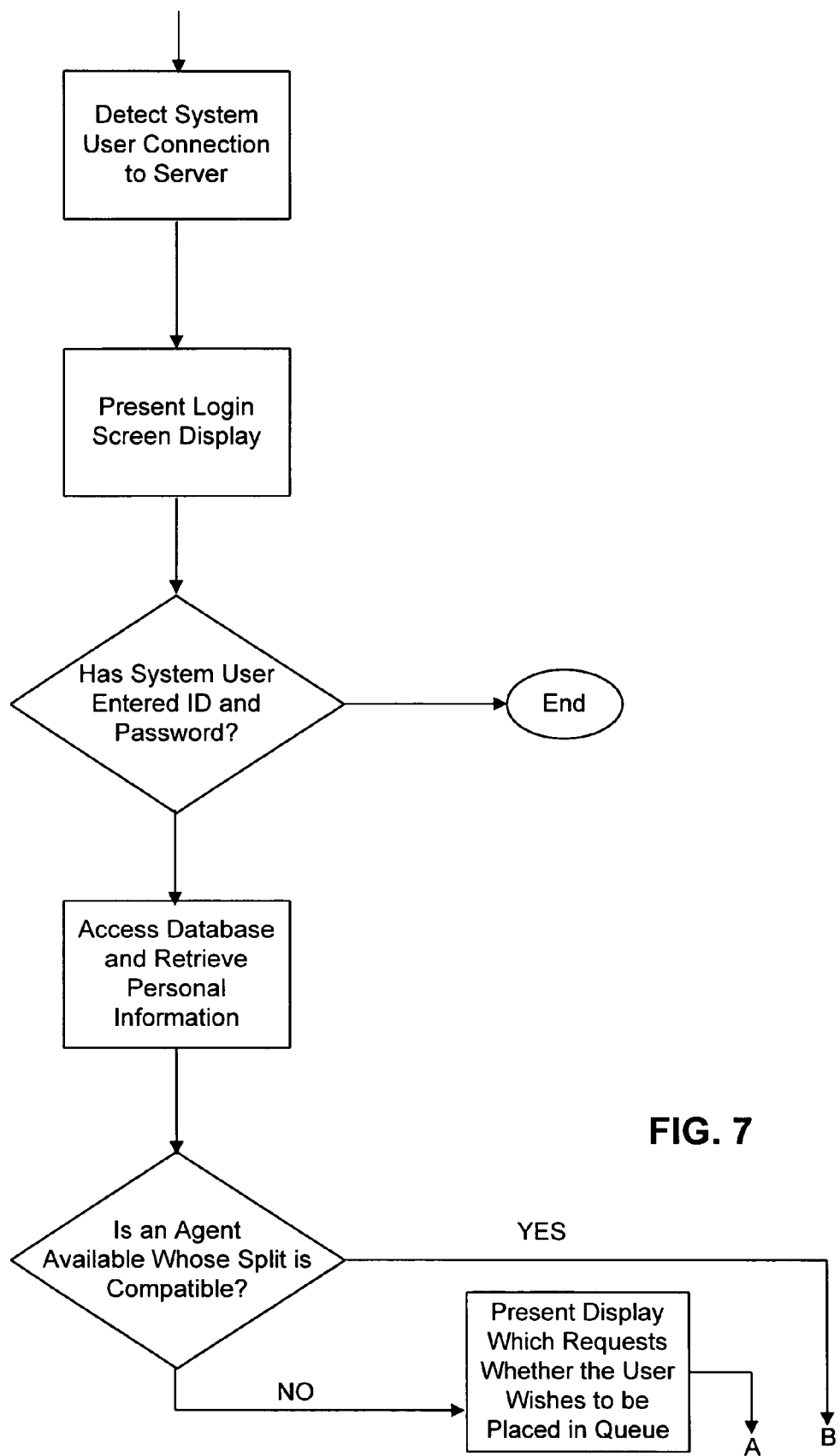
FIG. 7 discloses a flow chart which describes the routing of connections to agents.
Figure 7:
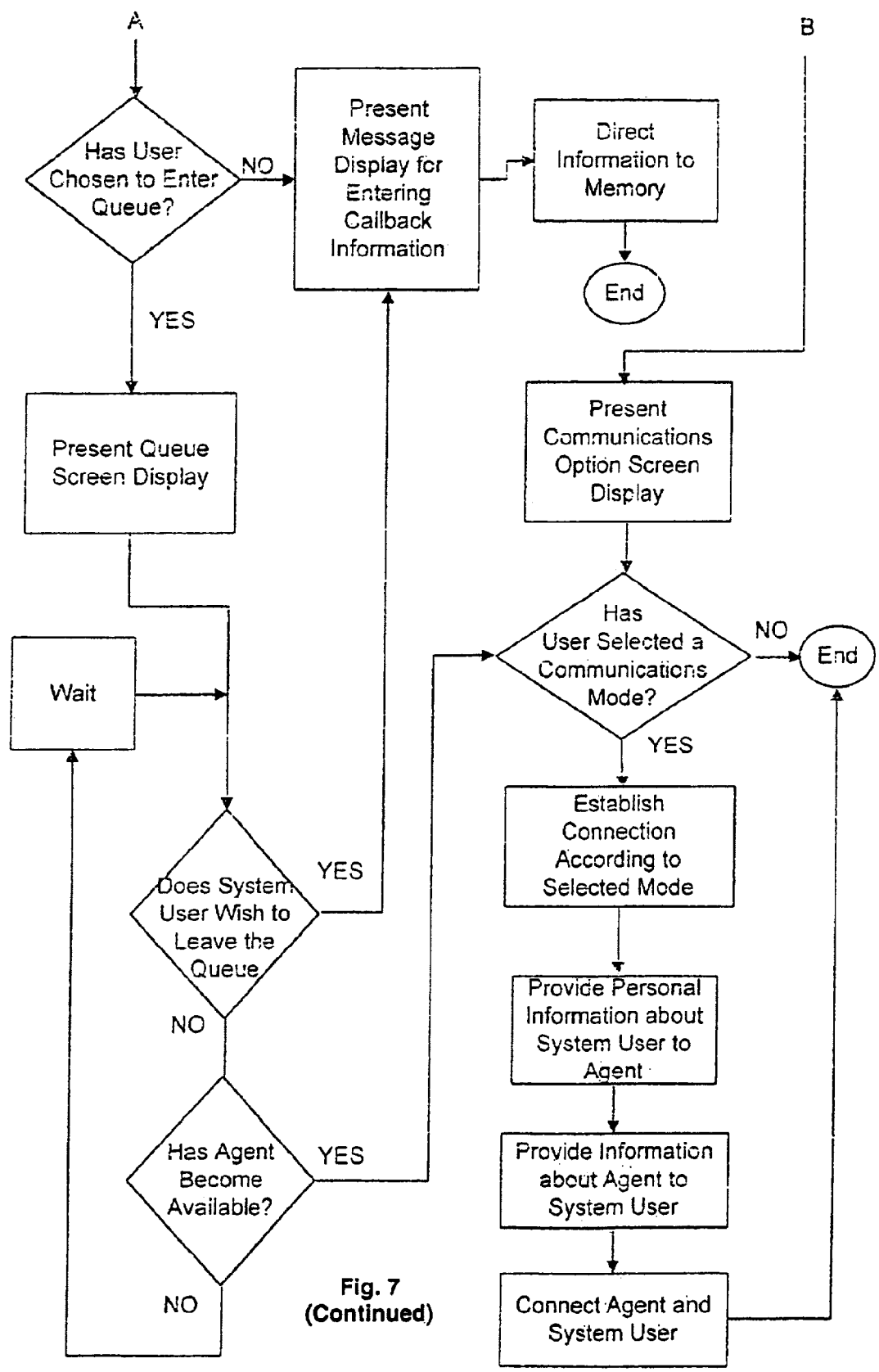

Disclosed in FIG. 7 is a flowchart which describes in detail the operations of the communications server when a system user is establishing a connection in order to communicate with an agent of a business or organization. Initially, when the system user connects with the communications server, a screen display is presented through which the system user may enter a user name and or password. Once this information is entered, a search of the database in the communications server is performed to retrieve the profile of a particular system user. Based on the information retrieved, an analysis may be performed to identify an agent qualified to communicate with the system user. If there is not an available agent, the system user is presented with a screen display which provides a choice as to whether the system user wishes to enter a queue to wait for an available agent, or they would prefer to leave a message to be contacted later by an agent.

If the system user wishes to leave a message, a screen display is presented through which the system user may enter communications information. This information may include e-mail addresses or telephone number. The system user is then disconnected from the server.

If the system users chooses to wait in the queue, the communications server will move the connection to the queue where the system user will be presented with a screen display which contains information as to position in the queue and the wait time. As described above, a hypertext link may be provided for the system user to connect with other web sites while waiting. At any time while system user is in the queue, the option is available to opt out and enter information for receiving a call back.

Once an available agent is identified either initially or after a wait in the queue, a screen display will be presented to the system user through which a mode of communication may be selected. Once the desired mode is selected, a connection will be established between the system user and the available agent. In conjunction with establishing the connection, the communication server provides the agent with the personal information for the system user which was retrieved from memory. The system user may also be presented with a screen display which includes information about the selected agent. Upon completion of the interchange between the system user and the agent, either party may terminate the session.

The system described herein further includes the functionality to automatically route connections and manage and monitor the performance of the agents. When an agent is ready to begin work and begin receiving connections from system users, a log-in procedure is performed. Once this procedure is performed, the processor, through the agent processing module, may monitor which agents are currently logged in, which agents are available to receive calls, and the profile, or splits of the agents currently connected which is used to route the connections to the appropriate parties. The procedure for assigning calls will be described in greater detail below.

Figure 8:
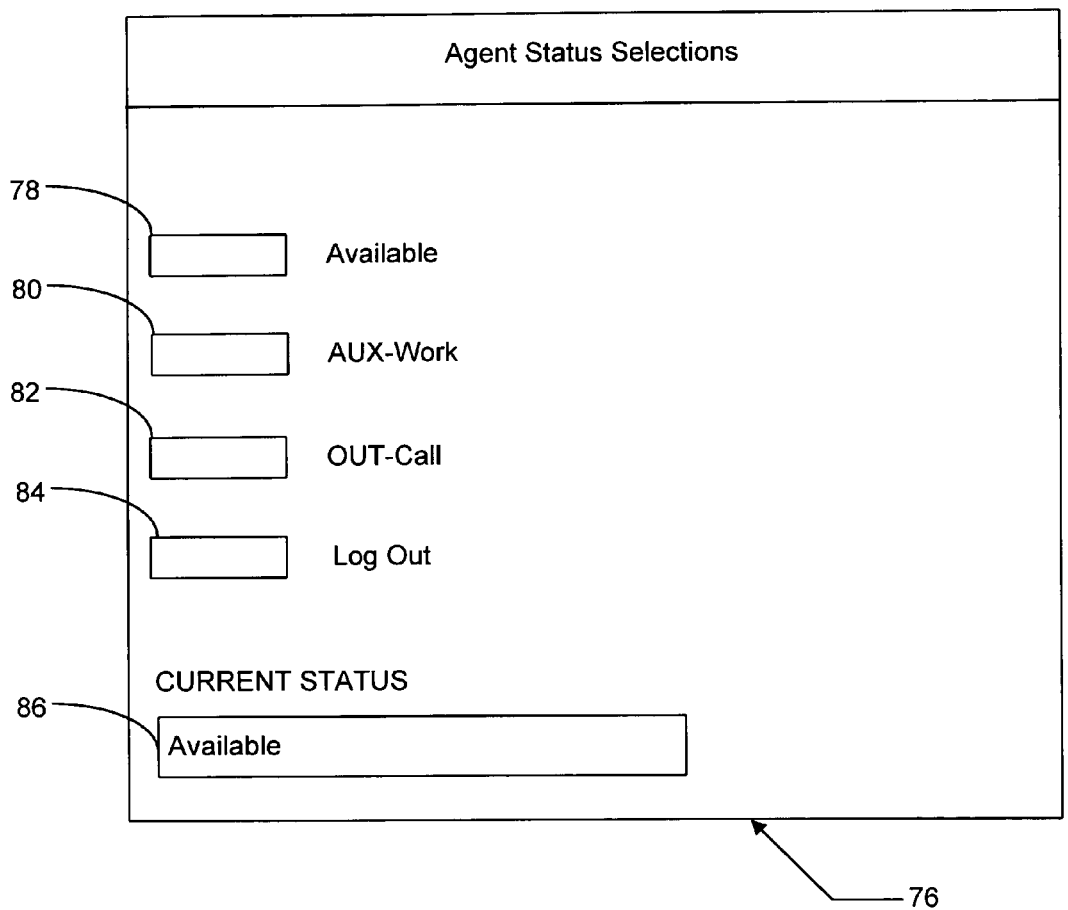
FIG. 8 discloses an interactive screen display employed by an agent to change status.

Once an agent logs in, an interactive display graphic such as that disclosed in FIG. 8 is presented. Through this display graphic, the agent may change his or her status with regards to receiving connections. If the available button 78 is selected, this indicates to the communications server that the agent is ready to begin receiving connections. If the AUX-work button 80 is selected, this indicates that the agent is currently unavailable for receiving connections. This may be due to work currently being performed on a previous connection or when the agent is on a break.

If the out-call button 82 is selected, this indicates to the communications server that the agent is currently placing an outgoing call to a customer. This feature may be programmed so that as soon as the connection is terminated and button 80 is not selected, the agent is available to receive additional connections. Finally, if the agent selects log-out button 84, the agent is logged out of the system. Provided on the display graphic is dialogue box 86 which provides notice to the agent, or whoever is viewing the screen, of the current status of the agent logged in.

Figure 9:
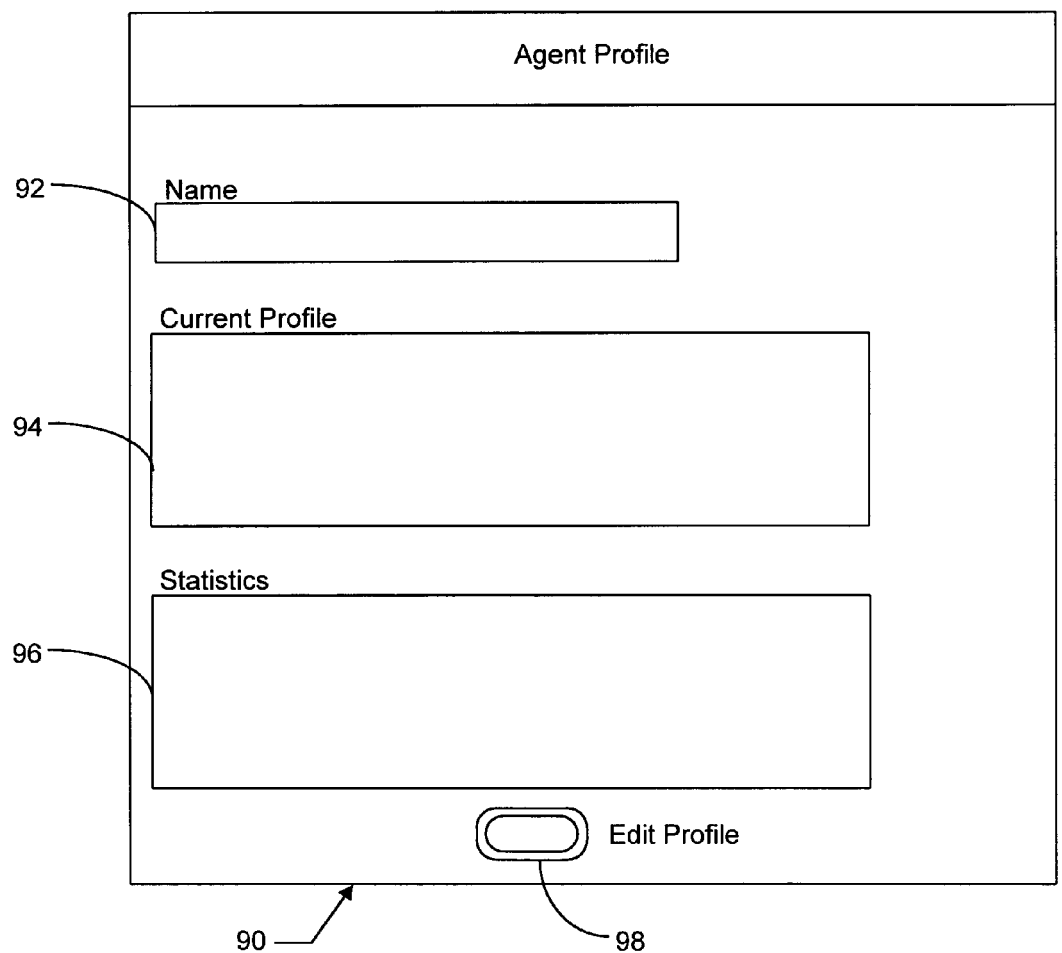
FIG. 9 discloses a screen display which presents statistics as to the performance and profiles of agents.

As described above, each of the agents who log into the system have a split which includes information as to the profile of the agent stored in memory. Included in the profile may be things such as language proficiency, types of system users which may be routed to them, as well as statistics regarding length of call and disposition of call. Disclosed in FIG. 9 is an interactive screen display which a supervisor may view with regard to a particular agent. In the display graphic 90, a dialogue box 92 provides the name of the particular agent. In dialogue box 94 is the profile for the agent at issue. Through selection of the edit profile button 98, a supervisor may edit the profile of a particular agent to expand or contract the duties. A final dialogue box 96 may also be provided which lists relevant statistics for the agents.

An additional feature which may also be included in the invention is a screen display which an agent or supervisor may view in order to identify the party currently in the queue. Such a screen display 100 is disclosed in FIG. 10. Functionality may be provided to route parties to the particular agents based on this identification. For example, if a supervisor views the queue and identifies a person to be an important person based on a system users domain address, the supervisor has the ability to deal with this party in a special manner. Determination of the VIP status may be done based on several factors. For example, volumes of purchase, average purchase price, etc. The supervisor may be allowed to move such callers in the queue to another split or direct each individual caller to an agent of his or her choice.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant are, within the scope of the present invention. The embodiments described hereinabove are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. An automated customer service system for establishing a line of communication with a system user and a selected customer service agent according to a selected mode of communication comprising:
    a processing device in connection with a communications device wherein the processing device is configured to present a plurality of interactive screen displays to the system user connecting with the processing device using a web browser, the plurality of interactive screen displays including:
        an identification screen display configured for the system user to enter identification information;
        a communications mode screen display which present a plurality of modes of communication each of which are selectable by the system user in order to establish real time connection with an identified service agent by the selected mode of communication which includes at least one of: audio, video, and data conferencing; and
        a call status display which is presentable to the system user who has selected to wait in a queue, wherein the call status display provides wait time information for the system user as well as at least one alternative system user activity which includes at least one of: visiting at least one website and providing call back information which includes the selected mode of communication; and
        a call back display configured so that the system user may select from the plurality of modes of communication for a call back as well as a preferred time for the call back; and
    said processing device being further configured to store the preferred time for the call back and the selected mode of communication for the call back in memory and to periodically search the memory and automatically schedule the call back with an identified service agent.

2. The system of claim 1 further including a service agent display which is presentable to the system user wherein the service agent display includes profile information for the identified service agent.

3. The system of claim 1 further including a supervisor interface through which at least one of the following may be performed: the agent status may be viewed, agent profile information may be viewed, and the agent profile information may be edited.

4. The system of claim 1 wherein the call status display further includes position information in the queue for the system user.

5. The system of claim 1 wherein the agent status includes at least one of: agents currently active, identification information for connections in the queue, and change of agent status.

6. The system of claim 1 further including a screen display that can be provided to an agent for viewing the profile information for the system user waiting in the queue.

7. The system of claim 6 wherein the communications network is at least one of: the World Wide Web and the public switched telephone network.

8. A method of establishing a line of communication between a system user and a service agent comprising the step of:
    presenting an identification screen display to the system user that connects over a communications network using a web browser, said identification screen display being configured for the system user to enter identification information;
    upon receipt of the identification information, presenting a communications mode screen display which present a plurality of modes of communication each of which are selectable by the system user in order to establish a real time connection with an identified service agent, wherein the selected modes of communication include at least one of: audio, video, and data conferencing;
    detecting selection of one of the modes of communication and automatically determining whether one of the agents is free to receive a communication from the system user, and if one of the service agents is free, establishing a line of communication according to the selected mode of communication;
    if one of the service agents is not available, presenting a screen display to the system user indicating that one of the service agents is free and inquiring if the system user wishes a call back or to be placed in a queue;
    if the system user selects to be placed in a queue, presenting a call status display which displays at least one of: wait time information for the system user and queue position information for the system user;

if the system user wishes a call back, presenting a call back display configured so that the system user may select a mode of communication for a call back as well as a preferred time for the call back and storing; and storing in memory the selected call back time and mode of communication and periodically searching the memory to retrieve the stored information and automatically scheduling a call back to the system user using the selected mode of communication.

9. The method of claim 8 further comprising the step of presenting a profile display to the system user for the agent to which the system user has been connected.

10. The method of claim 8 further comprising the step of initiating a call back to the system user at the selected time via the selected mode of communication.

11. The method of claim 10 wherein the selected modes of communication include at least one of: audio communication, video communication, and data communication.

12. The method of claim 8 further comprising the step of presenting a supervisor interface which includes at least one of: current status of the agents connected to the network and profile of one or more of the agents.

13. The method of claim 12 further comprising the step of editing the agent profile based on input received through the supervisor interface.

14. The method of claim 12 further including the step of generating and presenting a screen display for viewing the profile information for the system user waiting in the queue.

\* \* \* \* \*